US007586762B2

(12) United States Patent
Hsu

(10) Patent No.: US 7,586,762 B2
(45) Date of Patent: Sep. 8, 2009

(54) POWER SUPPLY CIRCUIT FOR LCD BACKLIGHT AND METHOD THEREOF

(75) Inventor: Yu-Chang Hsu, Taipei (TW)

(73) Assignee: O2Micro International Limited, Grand Cayman (KY)

( * ) Notice: Subject to any disclaimer, the term of this patent is extended or adjusted under 35 U.S.C. 154(b) by 260 days.

(21) Appl. No.: 11/638,601

(22) Filed: Dec. 12, 2006

(65) Prior Publication Data

US 2008/0136353 A1 Jun. 12, 2008

(51) Int. Cl.
*H02M 3/335* (2006.01)
*H05B 37/00* (2006.01)

(52) U.S. Cl. .................................... 363/21.12; 315/160

(58) Field of Classification Search ......... 315/160–161, 315/200 R, 209 R, 312; 363/15–16, 17, 21.04, 363/21.12, 34
See application file for complete search history.

(56) References Cited

U.S. PATENT DOCUMENTS 5,940,287 A * 8/1999 Brkovic ...................... 363/127
6,297,970 B2 * 10/2001 Hemena et al. .......... 363/21.06
6,369,461 B1 * 4/2002 Jungreis et al. ............... 307/46
7,012,817 B2 * 3/2006 Liu et al. ...................... 363/20
7,046,525 B2 * 5/2006 Smidt et al. .............. 363/21.12
7,138,730 B2 * 11/2006 Lai ............................ 307/82
7,208,886 B2 * 4/2007 Hsieh et al. ................. 315/291
7,221,130 B2 * 5/2007 Ribeiro et al. .............. 323/271
7,408,796 B2 * 8/2008 Soldano ...................... 363/127

* cited by examiner

*Primary Examiner*—Douglas W Owens
*Assistant Examiner*—Minh D A

(57) ABSTRACT

Power supply circuit for LCD backlight and method thereof are disclosed in the present invention. The power supply circuit includes a power bus, a boost converter, a buck converter and a controller. The power bus supplies power to a load. The boost converter and buck converter are coupled to the power bus respectively for storing the power from the power line and restoring the power to the load. A controller is further coupled to the buck and boost converter for enable them alternatively according to a pulse width modulation (PWM) signal.

18 Claims, 8 Drawing Sheets

POWER SUPPLY CIRCUIT FOR LCD BACKLIGHT AND METHOD THEREOF

FIELD OF THE INVENTION

The present invention relates to a power supply, and more particularly to the power supply for a liquid crystal display (LCD) backlight.

BACKGROUND OF THE INVENTION

LCDs are electronically controlled light valves that use a white "backlight," such as lighting emitting diodes (LEDs) and cold-cathode fluorescent lamps (CCFLs), to illuminate the color screen. Nowadays, the CCFLs play an increasing role in backlight applications for highest available efficiency. However, it requires a high alternating voltage (AC) voltage to ignite and operate the CCFLs. Typically, the igniting voltage is approximately 2 to 3 times larger than the operating voltage that is approximately 1000 volts for a longer lamp. To generate such a high AC voltage from a direct current (DC) power source, e.g., a rechargeable battery, DC/AC inverters with various CCFL drive architectures including Royer (self-oscillating), half-bridge, full-bridge and push-pull have been implemented. Moreover, dimming control techniques are also developed to control the brightness of the CCFLs. Especially, pulse width modulation (PWM) dimming is rapidly becoming an optional choice since it is less display-sensitive and offers more flexibility in choosing brightness levels.

However, during the PWM dimming, the inverter is actually being turned on and off at the PWM frequency, so that there will be a large ripple current on the power supply line of the inverter. Additionally, those stated CCFL drive architectures are typically used to drive one CCFL. In recent years, there has been increasing interest in large size LCD displays, as required in LCD TV sets and computer monitors, which require multiple CCFLs for proper backlighting.

A block diagram of a prior art circuit 100 for supplying power to multiple CCFLs is depicted in FIG. 1. The circuit 100 is composed of a DC power source 110, a plurality of DC/AC inverters 120A to 120N, a plurality of CCFL loads 130A to 130N, and a controller 140. Each DC/AC inverter, 120A to 120N, converts a DC voltage from the DC power source 110 into an AC voltage. Each CCFL load, 130A to 130N, is individually powered by one of the DC/AC inverters, 120A to 120N. The controller 140 provides a synchronous PWM dimming signal to the DC/AC inverters, 120A to 120N, for controlling the DC to AC voltage conversion. Due to the synchronous PWM dimming signal, there is a large current ripple on a power bus 150 that is coupled between the DC power source 110 and the DC/AC inverters, 120A to 120N.

Because of the large current ripple, the current fed to the DC/AC inverters may be high enough to upset other devices. The current ripple is a prime source of electromagnetic interference (EMI). Thus, the current ripple on the power bus 150 is a cause of concern to system designers. In general, the designer will place input inductor and bulk capacitors at the power supply to reduce the current ripple on the power line 150. This method is only effective for the high frequency current ripple. For the low frequency current ripple with several hundreds hertz (Hz), it is not effective. That is, a low frequency PWM dimming may complicate the DC supply design requirements and give rise to unwanted visual artifacts on an LCD panel.

FIG. 2 illustrates a block diagram of another prior art circuit 200 for powering multiple CCFLs. For simplicity, description of the circuit 200 that is similar with the circuit in FIG. 1 is herein omitted and only the improvement is depicted in details. The circuit 200 includes a plurality of controllers 210A to 210N for supplying a string of phase-shifted dimming signals PWM1 to PWMN respectively to the plurality of DC/AC inverters 120A to 120N. Controlled by a respective phased-shifted dimming signal, each DC/AC inverter has 360°/N phase shift between the consecutive DC/AC inverters, where N is the number of the DC/AC inverters. Due to the string of the phase-shifted dimming signals PWM1 to PWMN, the current ripple on the power bus 150 is effectively reduced to 1/N of the current ripple in FIG. 1.

Furthermore, those skilled in the art will recognize that the light emitting diodes (LEDs) may replace the CCFLs for backlight purpose and consequently DC/DC converters may replace the DC/AC inverters for powering the LEDs in FIGS. 1 and 2.

FIG. 3 illustrates emulation diagrams for the circuits in FIGS. 1 and 2. In FIG. 3, a plot (A) shows the current ripple emulated on a basis of the circuit 100 in FIG. 1, and a plot (B) shows the current ripple emulated on a basis of the circuit 200 in FIG. 2. Herein, the circuits in FIGS. 1 and 2 include 6 DC/AC inverters and 6 CCFLs. Referring to the plot (A), it can be observed that when the DC voltage is 24 volts and the maximum input power is approximately 100 watts during the full dimming, the peak to valley value of the current is approximately 4 amperes as the dimming duty is approximately 50%. Referring to the plot (B), it can be observed that when the DC voltage is 24 volts and the maximum input power is approximately 100 watts during the full dimming, the peak to valley value of the current is approximately 0.7 ampere as each of the dimming signals PWM1 to PWM6 has identical dimming duty of approximately 50% and equal phase delay relative to successive dimming signals. The current ripple in the circuit 200 is approximately ⅙ of the current ripple in the circuit 100.

Though the circuit in FIG. 2 can reduce the current ripple, the number of the controllers is increased greatly. Additionally, each CCFL load is powered by an individual DC/AC inverter in both circuits 100 and 200, the element count is large and in turn the overall cost and circuit size are tremendous.

SUMMARY OF THE INVENTION

The present invention provides a power supply with reduced current ripple and meanwhile cost savings are achieved. The power supply includes a power bus, a boost converter, a buck converter and a controller. The power bus supplies power to a load. The boost converter and buck converter are coupled to the power bus respectively for storing the power from the power line and restoring the power to the load. A controller is further coupled to the buck and boost converter to enable them alternatively according to a pulse width modulation (PWM) signal.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
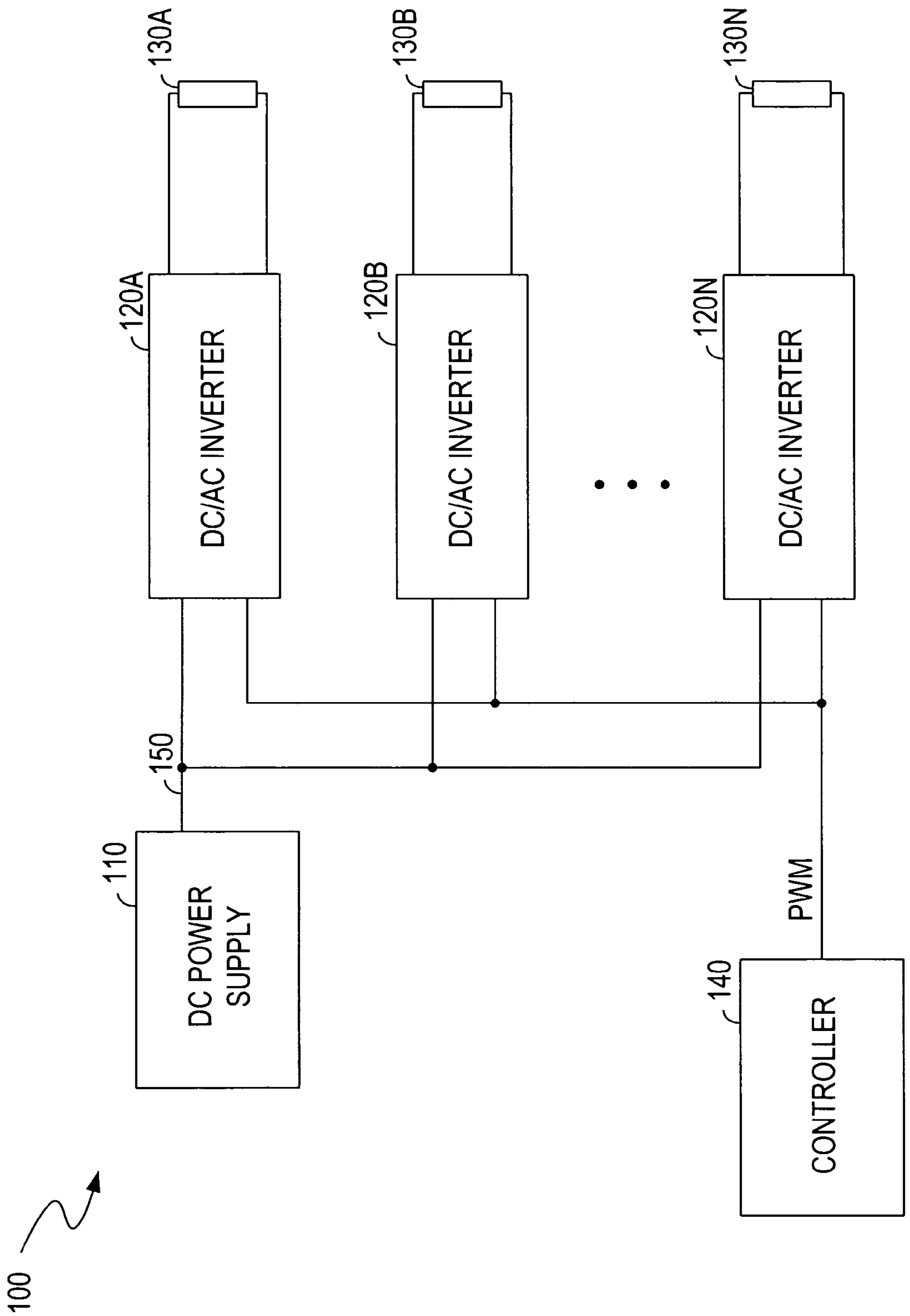
FIG.1 PRIOR ART
FIG. 1 is a block diagram of a prior art power supply circuit for LCD backlight.
Figure 2:
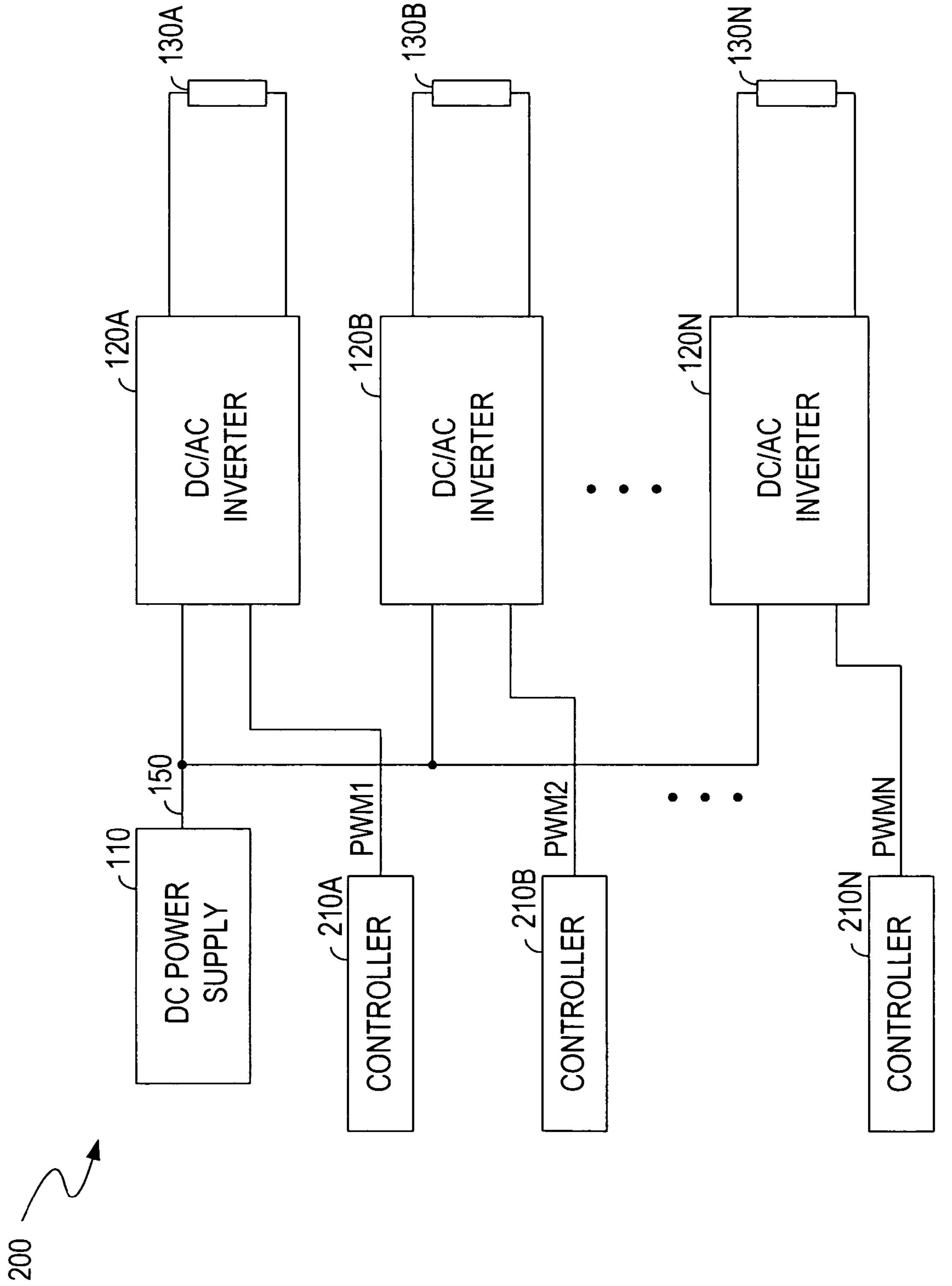
FIG. 2 PRIOR ART
FIG. 2 is a block diagram of another prior art power supply circuit for LCD backlight.
Figure 3:
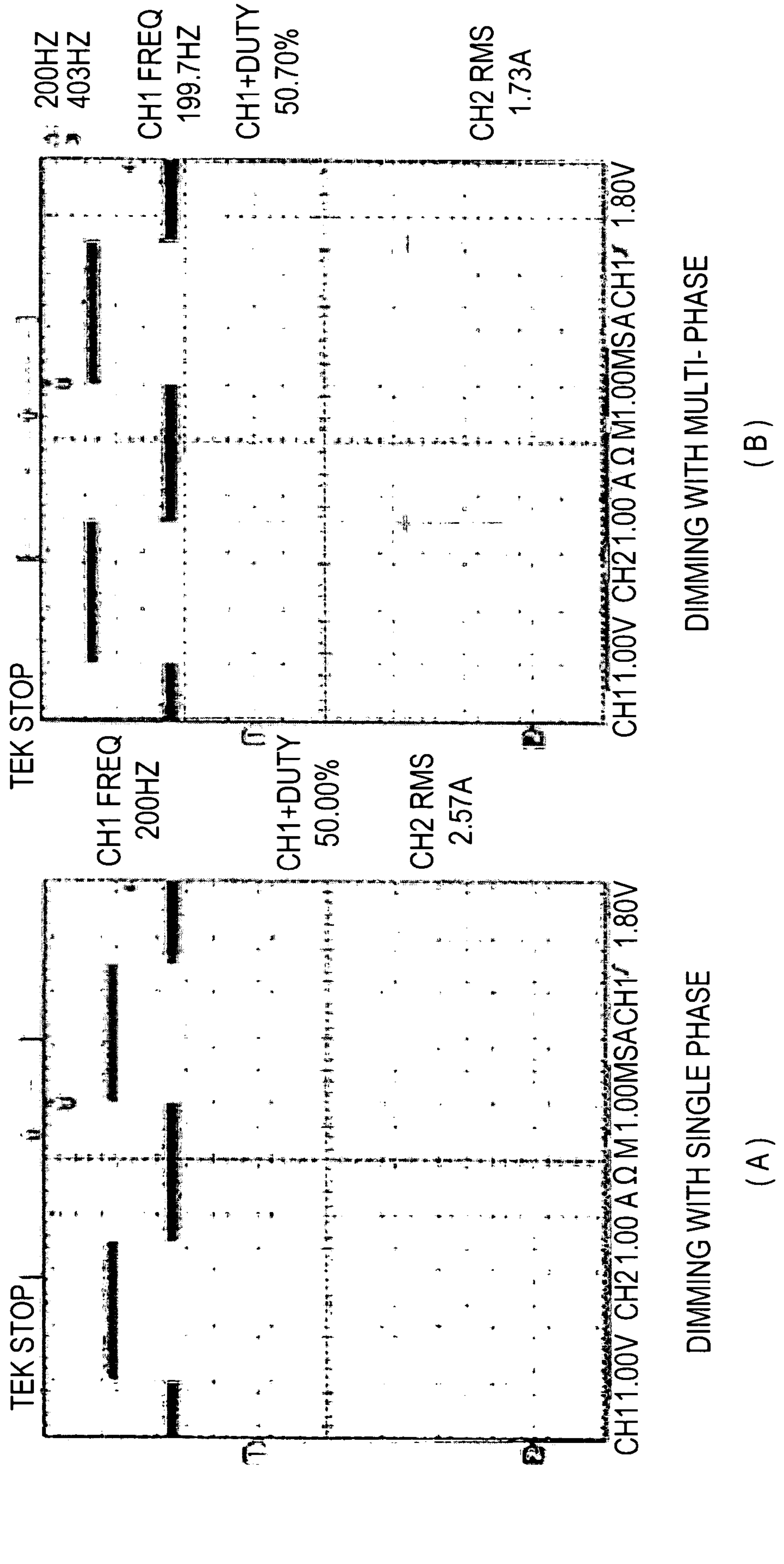
FIG. 3 PRIOR ART
FIG. 3 is an emulation diagram for the circuits in FIGS. 1 and 2.
Figure 4:
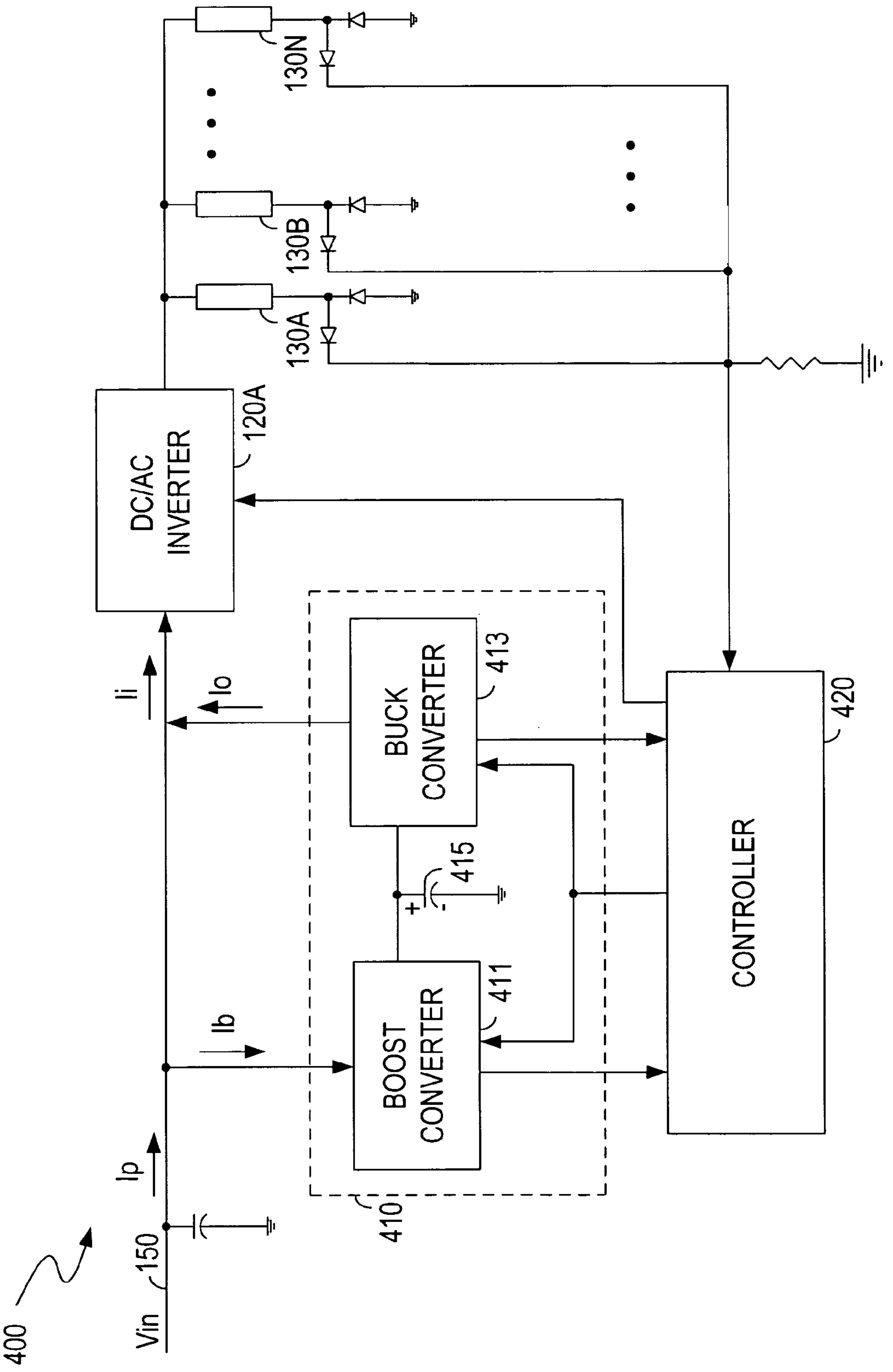
FIG. 4 is a block diagram of a power supply circuit according to one embodiment of the present invention.

FIG. 4 illustrates a block diagram of a power supply circuit 400 according to one embodiment of the present invention. The power supply circuit 400 includes the DC power source 110, a bidirectional power supply (BPS) 410 and a controller 420. The power line 150 is coupled to the power source 110 and the BPS 410. The DC power source 110 is capable of supplying a DC voltage Vin and an input current to the power line 150. Controlled by the controller 420, the BPS 410 is capable of reducing the current ripple on the power line 150 before the current is delivered to the DC/AC inverter 120A. The BPS 410 is coupled to the power bus 150 and includes a boost converter 411, a buck converter 413 and a capacitor 415. The controller 420 is coupled to the BPS 410 for controlling the boost converter 411 and the buck converter 413 according to a dimming signal, which may be a pulse width modulation (PWM) signal. The controller 420 is further coupled to the DC/AC inverter 120A for adjusting the power delivered to the plurality of loads, e.g., the CCFLs 130A to 130N, based on the PWM dimming signal. In applications, the PWM dimming signal may be provided externally by a device or generated internally by the controller 420. Simultaneously, the controller 420 receives feedback signals from the BPS 410 for ensuring the BPS 410 operates at a boundary current mode, and also receives a current feedback signal from the plurality of CCFLs for tightly controlling the brightness of the CCFLs.

Those skilled in the art will recognize that the DC/AC inverter 120A may be configured in various topologies, such as Roger, the full-bridge, the half-bridge and the push-pull. Furthermore, when the plurality of loads are LEDs, the DC/AC inverter 120A may be replaced by a DC/DC converter with various topologies, such as SEPIC, buck-boost, boost and buck. Additionally, with the power supply circuit 400, only one DC/AC inverter is sufficient to drive a plurality of CCFLs that are coupled in parallel. Similarly, only one DC/DC converter is sufficient to drive a plurality of LEDs that are coupled in parallel.

Figure 5:
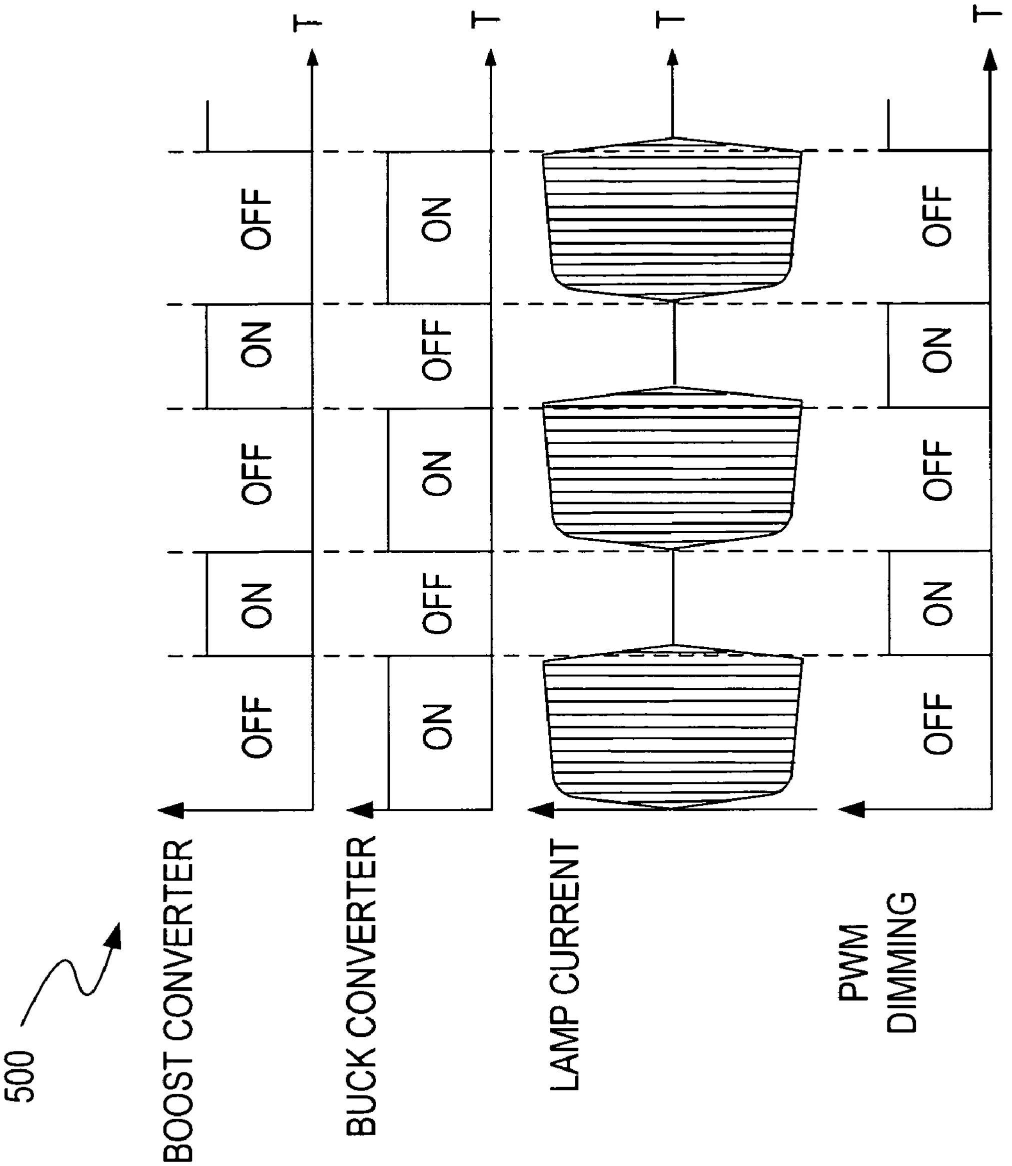
FIG. 5 is a timing diagram of the power supply circuit in FIG. 4.

FIG. 5 illustrates a timing diagram 500 of the power supply circuit 400 in FIG. 4. As shown in FIG. 5, the PWM dimming signal has an ON state and an OFF state. During the ON state of the PWM dimming signal, the boost converter 411 is enabled while the buck converter 413 is disabled. During the OFF state of the PWM dimming signal, the boost converter 411 is disabled while the buck converter 413 is enabled. With reference to FIG. 4, assuming the input current on the power bus 150 is $I_p$ during the full dimming, those skilled in the art will recognize that the input current $I_p$ is provided by the DC power source 110 and remains constant since total output power of the DC/AC inverter 120A is constant during the full dimming. However, during the PWM dimming, the input current on the power bus 150 that is provided by the DC power source 110 will have severe ripple and thus the BPS 410 is implemented to reduce the current ripple on the power bus 150. During the ON state of the PWM dimming signal, an average input current $I_b$ will be delivered from the power bus 150 to the boost converter 411 and during the OFF state of the PWM dimming signal, an average output current $I_o$ will be delivered from the buck converter 413 to the power bus 150 and eventually to the DC/AC inverter 120A. Totally, a current $I_i$ in combination of the current from the BPS 410 and the DC power source 110 will be delivered from the power bus 150 to the DC/AC inverter 120A during the PWM dimming. Owing to the constant current from the BPS 410, the current ripple on the power bus 150 will be reduced dramatically.

In terms of energy transition, during the ON state of the PWM dimming signal, the enabled boost converter 411 transfers the DC voltage Vin on the power bus 150 to a higher voltage Vs across the capacitor 415. The stored energy in the capacitor 415 can be given by an equation 1), $$E = \frac{1}{2} \times C_S \times (V_S^2(D) - V_{in}^2) \qquad 1)$$

where E is defined as the stored energy in the capacitor 415, Cs is defined as the capacitance of the capacitor 415, D is defined as the operating duty of the BPS 410, and $V_S(D)$ is a function of the variable D. During the OFF state of the PWM dimming signal, the energy stored in the capacitor 415 is restored to the DC/AC inverter 120A through the enabled buck converter 413. Meanwhile, the energy delivered from the DC power source 110 is also received by the DC/AC inverter 120A. Since the total energy delivered to the DC/AC inverter is from the DC power source 110 as well as from the stored energy, the current ripple on the power bus 150 is reduced dramatically owing to the stored energy. Furthermore, to minimize the current ripple on the power bus 150, it is essential to balance the energy flowing in and out of the BPS 410. In other words, the energy stored in the capacitor 415 during the ON state of the PWM dimming signal should be identical to the energy restored to the DC/AC inverter 120A during the OFF state of the PWM dimming signal. For the purpose, it is optimum for the BPS 410 to operate in the boundary current mode between the continuous and discontinuous current modes in each dimming cycle of the PWM dimming signal.

Figure 6:
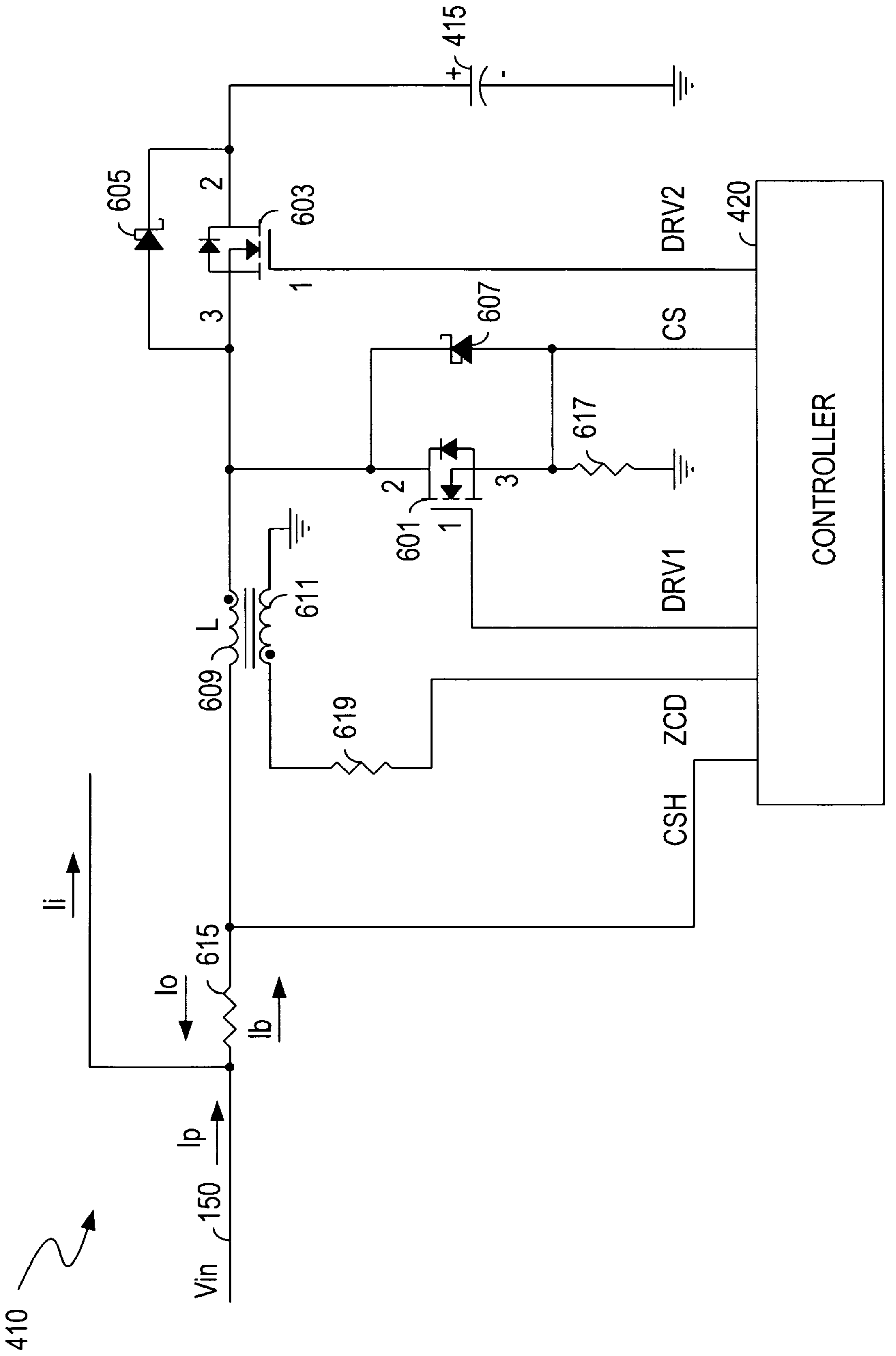
FIG. 6 is a schematic diagram of the bidirectional power supply in FIG. 4.

FIG. 6 illustrates a schematic diagram of the BPS 410 in FIG. 4. The BPS 410 includes transistors 601 and 603, rectifiers 605 and 607, an inductor 609, an auxiliary winding 611, resistors 615, 617 and 619, and the capacitor 415. The transistors 601 and 603 are typically constructed of power MOSFETs, and the rectifiers 605 and 607 may be constructed of Schottky diodes. A terminal 1 of the transistor 601 receives a driving signal DRV1 from the controller 420, a terminal 2 of the transistor 601 is coupled to a cathode of the rectifier 607, and a terminal 3 of the transistor 601 is coupled to an anode of the rectifier 607. Similarly, the transistor 603 is coupled to the rectifier 605. A terminal 1 of the transistor 603 receives a driving signal DRV2 from the controller 420. Furthermore, the terminal 3 of the transistor 601 is coupled to the ground through the resistor 617, and the terminal 2 of the transistor 603 is coupled to the ground through the capacitor 415. One terminal of the inductor 609 is coupled to the power bus 150 through the resistor 615, and the other terminal of the inductor 609 is coupled to the terminal 2 of the transistor 601 and to the terminal 3 of the transistor 603. Additionally, a transformer is formed by placing the auxiliary winding 611 in parallel with the inductor 609 and therefore an induction voltage is produced at the auxiliary winding 611. The auxiliary winding 611 is further coupled in series with the resistor 619 which is capable of limiting the current flowing from the auxiliary winding to the controller 420 into a safe range.

During the ON state of the PWM dimming signal, the BPS 410 acts as the boost converter formed by the transistor 601, the rectifier 605, the inductor 609 and the capacitor 415. During the OFF state of the PWM dimming signal, the BPS 410 acts as the buck converter formed by the transistor 603, the rectifier 607, the inductor 609 and the capacitor 415. When the BPS 410 acts as the boost converter, the boundary current mode is ensured by feedbacks signals CS and ZCD. When the BPS 410 acts as the buck converter, the boundary current mode is ensured by feedbacks signals CSH and ZCD. The feedback signals CS and CSH are sensed respectively by the resistors 617 and 615. The feedback signal ZCD is provided by the auxiliary winding 611.

During the ON state of the PWM dimming signal, the driving signal DRV1 provided by the controller 420 switches the transistor 601 alternately on and off. When the transistor 601 is switched on, the rectifier 605 is reverse biased and the current of the inductor 609 ramps up linearly to a peak current $I_{LPA}$. This represents an amount of stored energy in the inductor 609. When the transistor 601 is switched off, the stored energy in the inductor 609 as well as on the power line 150 is delivered to the capacitor 415 and charges it up to a voltage higher than the DC voltage Vin via the rectifier 605. In the instance, the BPS 410 acts as the boost converter and the relation between the voltage Vs across the capacitor 415 and the DC voltage Vin may be given by an equation 2), $$\frac{Vs(D)}{Vin} = \frac{1}{1-D} \qquad 2)$$

The operating duty D of the BPS 410 is herein equivalent to the switching duty of the transistor 601.

Furthermore, during the ON state of the PWM dimming signal, the boundary current mode is achieved by controlling a switch timing of the transistor 601 based on the feedback signals CS and ZCD. The feedback signal CS indicates whether an inductor current IL reaches the peak current $I_{LPA}$. When the inductor current IL reaches the peak current $I_{LPA}$, the controller 420 will switch off the transistor 601 in response to the feedback signal CS. The feedback signal ZCD indicates whether the inductor current IL reaches zero. When the inductor current IL reaches zero, the controller 420 will switch on the transistor 601 in response to the feedback signal ZCD.

During the OFF state of the PWM dimming signal, the driving signal DRV2 provided by the controller 420 switches the transistor 603 alternately on and off. When the transistor 603 is switched on, the rectifier 607 becomes reverse biased and the energy stored in the capacitor 415 is restored to the inductor 609 as well as the DC/AC inverter 120A in FIG. 4. When the transistor 603 is switched off, the inductor current flows through the rectifier 607, which in turn transfers some of the energy stored in the inductor 609 to the DC/AC inverter 120A in FIG. 4. In the instance, the BPS 410 acts as the buck converter and the relation between the voltage Vs across the capacitor 415 and the DC voltage Vin may be given by an equation 3).

$$\frac{Vs(D)}{Vin} = \frac{1}{D} \qquad 3)$$

The operating duty D of the BPS 410 is herein equivalent to the switching duty of the transistor 603.

Furthermore, during the OFF state of the PWM dimming signal, the boundary current mode is achieved by controlling a switch timing of the transistor 603 based on the feedback signals CSH and ZCD. The feedback signal CSH indicates whether the inductor current IL reaches a peak current $I_{LPB}$. When the inductor current IL reaches the peak current $I_{LPB}$, the controller 420 will switch off the transistor 603 in response to the feedback signal CSH. The feedback signal ZCD indicates whether the inductor current IL reaches zero. When the inductor current IL reaches zero, the controller 420 will switch on the transistor 603 in response to the feedback signal ZCD.

Figure 7:
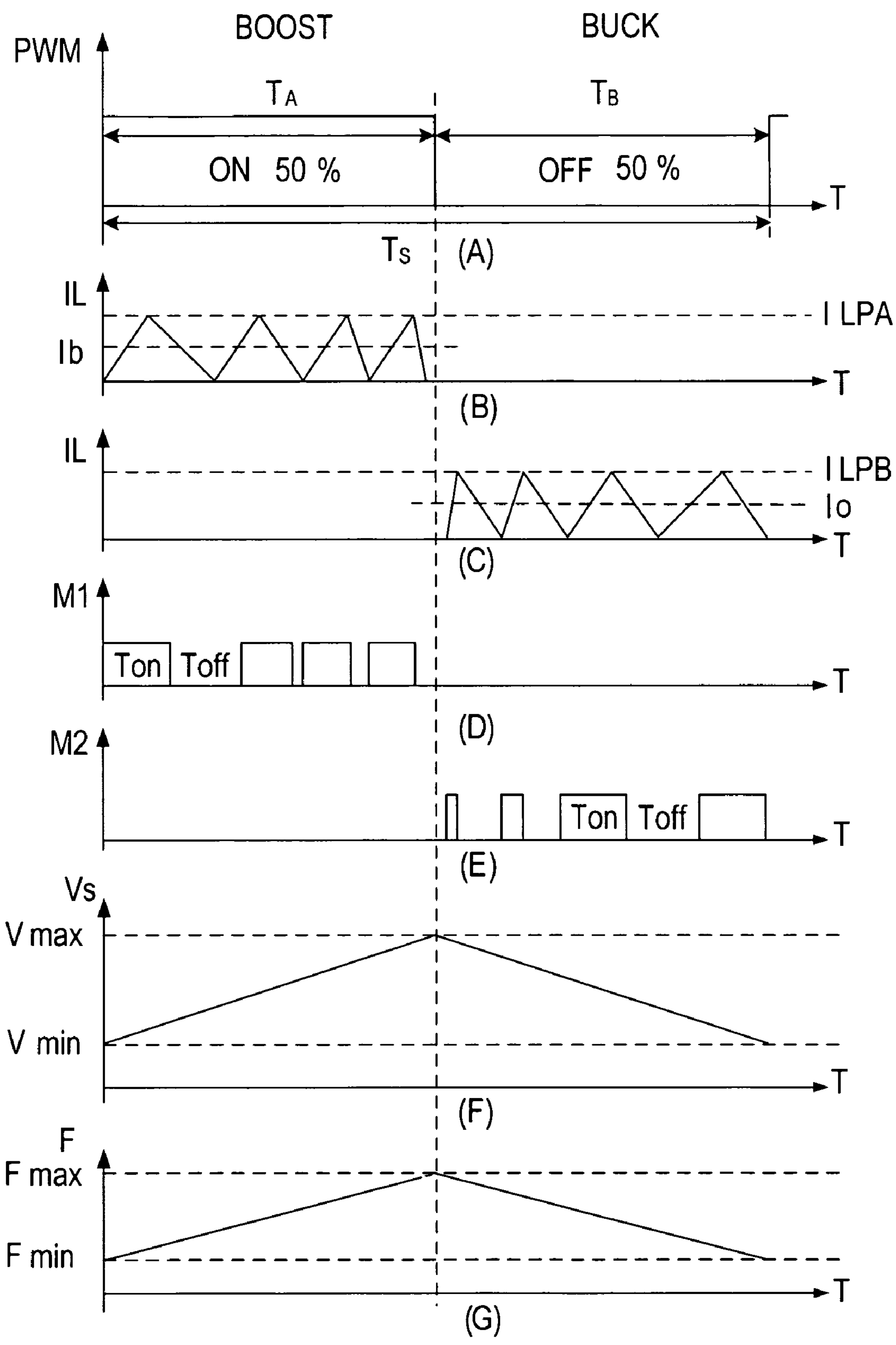
FIG. 7 is a timing diagram of the bidirectional power supply in FIG. 6.

FIG. 7 illustrates a timing diagram of the BPS 410 in FIG. 5. A plot (A) depicts a single cycle of the PWM dimming signal with equal ON and OFF period. The period of the PWM ON state is defined as $T_A$, the period of the PWM OFF state is defined as $T_B$, and the period of the PWM dimming cycle is defined as $T_S$, which is equal to $T_A$ plus $T_B$. A plot (B) depicts a waveform of the inductor current IL when the BPS 410 acts as the boost converter during the $T_A$ interval. In the boundary current mode, the peak current $I_{LPA}$ is two times larger than the average input current $I_b$ and may be given by an equation 4), $$I_{LPA} = 2 \times I_p \times \frac{T_B}{T_S} \qquad 4)$$

where $I_p$ is the constant input current during the full dimming as previously stated. Referring to the equation 4), it can be concluded that the peak current $I_{LPA}$ is constant during the $T_A$ interval of one PWM dimming cycle and proportional to the period $T_B$ as the duty ratio of the PWM dimming signal changes. A plot (C) depicts a waveform of the inductor current IL when the BPS 410 acts as the buck converter during the $T_B$ interval. In the boundary current mode, the peak current $I_{LPB}$ is two times larger than the average output current $I_o$ and may be given by an equation 5).

$$I_{LPB} = 2 \times I_P \times \frac{T_A}{T_S} \qquad 5)$$

Referring to the equation 5), it can be concluded that the peak current $I_{LPB}$ is constant during the $T_B$ interval of one PWM dimming cycle and proportional to the period $T_A$ as the duty ratio of the PWM dimming signal changes. In terms of energy flow, an equation 6) may be obtained, $$E_{in} = Vin \times \frac{I_{LPA}}{2} \times T_A = Vin \times \frac{I_{LPB}}{2} \times T_B = E_{out} \qquad 6)$$

where $E_{in}$ is defined as the energy flowing into the BPS 410 during the $T_A$ interval and $E_{out}$ is defined as the energy flowing out of the BPS 410 during the $T_B$ interval. When the duty ratio of the PWM dimming signal varies, the energy balance would be easily maintained by regulating the peak currents $I_{LPA}$ and $I_{LPB}$ in accordance with the $T_B$ and $T_A$ interval respectively. On one hand, the peak currents $I_{LPA}$ and $I_{LPB}$ may respectively determine a switch timing of the transistors 601 and 603 as previously stated. On the other hand, the switch timing of the transistors 601 and 603 may respectively regulate the peak currents $I_{LPA}$ and $I_{LPB}$.

A plot (D) illustrates a state of the transistor 601 during the $T_A$ interval. As shown, the transistor 601 is switched alternatively on and off by the driving signal DRV1. The period when the transistor 601 is switched on is defined as $T_{on}$ and the period when the transistor 601 is switched off is defined as $T_{off}$. The $T_{on}$ and $T_{off}$ period may be respectively given by equations 7) and 8), $$T_{on} = \frac{L \times I_{LPA}}{Vin} \qquad 7)$$

$$T_{off} = \frac{L \times I_{LPA}}{V_S(D) - Vin} \qquad 8)$$

where L is defined as the inductance of the inductor 609. Referring to the equation 7), it can be concluded that the $T_{on}$ period is constant and proportional to the peak current $I_{LPA}$ when the duty ratio of the PWM dimming signal is set to be a first predetermined value, for example $T_B/T_S$. Referring to the equation 8), the $T_{off}$ period is variable as the voltage Vs across the capacitor 415 changes during the $T_A$ interval.

A plot (E) illustrates a state of the transistor 603 during the $T_B$ interval. As shown, the transistor 603 is driven alternatively on and off by the driving signal DRV2. The $T_{on}$ and $T_{off}$ period of the transistor 603 may be respectively given by equations 9) and 10).

$$T_{on} = \frac{L \times I_{LPB}}{V_S(D) - Vin} \qquad 9)$$

$$T_{off} = \frac{L \times I_{LPB}}{Vin} \qquad 10)$$

Referring to the equation 9), the $T_{on}$ period is variable as the voltage Vs across the capacitor 415 changes during the $T_B$ interval. Referring to the equation 10), it can be concluded that the $T_{off}$ period is constant and proportional to the peak current $I_{LPB}$ when the duty ratio of the PWM dimming signal is set to be a second predetermined value. Typically, when the first predetermined value is set to be $T_B/T_S$, the second predetermined value is equal to $T_A/T_S$.

A plot (F) illustrates a waveform of the voltage Vs across the capacitor 415, which is depicted according to the equation 2) in the $T_A$ interval and according to the equation 3) in the $T_B$ interval. In the $T_A$ interval, the operating duty D of the BPS 410 is equivalent to the switching duty of the transistor 601, which is increased gradually as indicated in the plot (D). In the $T_B$ interval, the operating duty D of the BPS 410 is equivalent to the switching duty of the transistor 603, which is increased gradually as indicated in the plot (E). Consequently, depending on the operating duty D, the voltage Vs will increase gradually from an initial minimum voltage Vmin to a maximum voltage Vmax during the $T_A$ interval and decrease back to the minimum voltage Vmin during the $T_B$ interval as indicated in the plot (F).

A plot (G) illustrates an operating frequency of the BPS 410. During the $T_A$ interval, the $T_{on}$ period is maintained constant, while the $T_{off}$ period is decreased gradually. It can be concluded that the operating frequency of the BPS 410 increases during the $T_A$ interval. Similarly, it can be concluded that the operating frequency of the BPS 410 decreases during the $T_B$ interval. Consequently, in one PWM dimming cycle, the operating frequency of the BPS 410 will increase gradually from an initial minimum frequency Fmin to a maximum frequency Fmax during the $T_A$ interval and decrease back to the minimum frequency Fmin during the $T_B$ interval as indicated in the plot (G).

Figure 8:
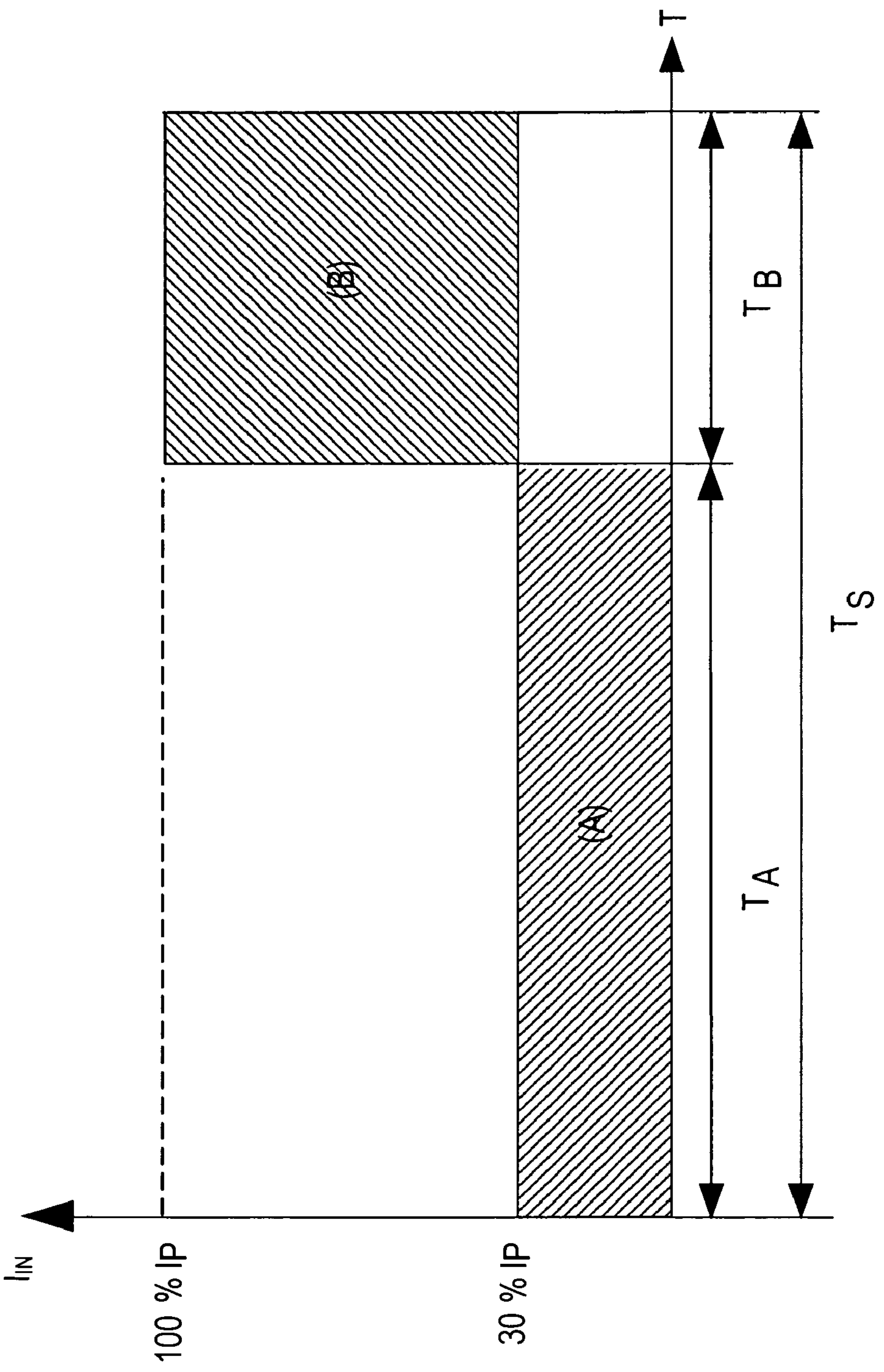
FIG. 8 is a timing diagram of the input current of the power supply circuit in FIG. 4.

FIG. 8 illustrates a timing diagram of the input current on the power bus 150. The input current is defined as $I_{IN}$ and plotted versus time according to the equations 4) and 5). During the PWM dimming, an exemplary duty ratio of the PWM signal is set to be 70%. Thus, according to the equation 4), the average input current $I_{IN}$ from the power bus 150 to the BPS 410 is 30% $I_p$, half of the peak current $I_{LPA}$ during the $T_A$ interval. The average input current $I_{IN}$ is absorbed by the BPS 410 and a block (A) with left-to-right slashes indicates the energy stored in the BPS 410. During the $T_B$ interval, the input current on the power bus 150 to the DC/AC inverter 120A is the sum of the input current from the DC power source 110 and the output current $I_o$ from the BPS 410. Eventually, the average input current $I_{IN}$ to the DC/AC inverter 120A during the PWM dimming is equal to the input current $I_P$ during the full dimming. The output current $I_o$ is half of the peak current $I_{LPB}$ calculated according to the equation 5). A block (B) with right-to-left slashes indicates the energy restored from the BPS 410 to the DC/AC inverter 120A. Due to the identical input and output energy of the BPS 410, the blocks (A) and (B) have equal area and thus the output current $I_o$ is equal to 70% $I_p$. Eventually, during the PWM dimming, the input current from the DC power source to the DC/AC inverter is maintained at a constant 30% $I_p$.

Additionally, to maintain the balance of the energy flow in the BPS 410, the voltage Vs across the capacitor 415 is not regulated by the controller 420 during the PWM dimming. Since there is no load to absorb the energy as the BPS 410 acts as the boost converter, it is possible that a dangerously high voltage may appear to breakdown the capacitor 415 and the transistors 601 and 603. Hence, in order to ensure the safety, the voltage Vs may be monitored timely. The voltage Vs may be given by an equation 11).

$$Vs(D) = \sqrt{\frac{2 \times V_{in} \times I_P \times \frac{T_B}{T_S} \times T_A}{C_S} + V_{in}^2} = \sqrt{\frac{2 \times P_{in} \times \frac{T_B}{T_S} \times T_A}{C_S} + V_{in}^2} \qquad 11)$$

According to the equation 11), it can be concluded that a higher Cs may prevent the voltage Vs from reaching the dangerously high voltage before the $T_A$ interval expires.

Those skilled in the art will realize that the BPS 410 may also be configured to act as a buck converter during the ON state of the PWM dimming signal and act as a boost converter during the OFF state of the PWM dimming signal, without deviation from the spirit of the present invention.

In operations, a display system may include a display screen, a plurality of backlight sources for backlighting the display screen and a power supply circuit for igniting and running the plurality of backlight sources. The power supply circuit may further include a DC power source, a DC/AC inverter and a power line coupled between the DC power source and the DC/AC inverter. The DC/AC inverter converts a DC voltage Vin from the DC power source to an AC voltage required by the plurality of backlight sources. However, there may be large current ripple on the power bus which will impact performance of the display system. To effectively reduce the current ripple on power bus, the BPS is implemented.

The BPS is coupled to the power line and may include a boost converter, a buck converter and a capacitor, wherein the boost converter and the buck converter operate alternately in response to a dimming signal, which may be a PWM dimming signal. Fox example, during the ON state of the PWM dimming signal, the boost converter is enabled and the buck converter is disabled. Thus, energy that is transferred on the power line from the DC power source will flow into the BPS and be stored in the capacitor through the enabled boost converter. During the OFF state of the PWM dimming signal, the stored energy in the capacitor of the BPS will be restored to the power line and finally received by the DC/AC inverter. Meanwhile, during the OFF state of the PWM dimming signal, the DC/AC inverter also receives energy directly from the DC power source through the power line. Owing to the energy restored from the BPS, the proportion of the energy directly from the DC power source is relatively low and thus the current ripple on the power line is reduced significantly. Additionally, to effectively reduce the current ripple, the BPS should maintain energy balance, that is, the energy flowing into the BPS should be identical to the energy flowing out of the BPS. To maintain energy balance, it is preferred for the BPS to operate in the boundary current mode.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A power supply comprising:

a power bus for providing voltage to a load;

a boost converter coupled to the power bus, wherein the boost converter converts an input voltage to a greater output voltage;

a capacitor coupled to the boost converter, wherein the greater output voltage from the boost converter is stored across the capacitor;

a buck converter coupled to the capacitor, wherein the greater output voltage stored across the capacitor is reduced and provided to the power bus; and a controller coupled to the boost converter and the buck converter, wherein the boost converter and the buck converter are enabled and disabled according to a pulse width modulation signal to balance an input energy into the power supply with an output energy from the power supply, wherein the pulse width modulation signal has two states, wherein further the boost converter is enabled and the buck converter is disabled when the pulse width modulation signal is in one of its two states, and the boost converter is disabled and the buck converter is enabled when the pulse width modulation signal is in the other of its two states.

2. The power supply of claim 1, wherein the boost converter is enabled and the buck converter is disabled when the pulse width modulation signal is in an on state.

3. The power supply of claim 2, wherein the boost converter is disabled and the buck converter is enabled when the pulse width modulation signal is in an off state.

4. The power supply of claim 1, wherein the pulse width modulation signal corresponds to a light dimming signal and the load corresponds to a light source.

5. The power supply of claim 1, wherein the power bus and the controller are coupled to a device selected from the group consisting of: an inverter, a converter.

6. A bi-directional power supply comprising:

a first transistor coupled to a power line which is used to step up a first DC voltage to a second DC voltage;

a second transistor coupled to the power line which is used to step down the second DC voltage to the first DC voltage;

a capacitor coupled to the first transistor and the second transistor for storing energy when the first transistor is switched on and providing energy when the second transistor is switched on; and non-synchronous rectifiers coupled to the first transistor and the second transistor, wherein the first transistor and the second transistor are controlled according to a control signal in order to balance energy flowing into the bi-directional power supply and energy flowing out of the bi-directional power supply to reduce ripple current on the power line, wherein the control signal has two states consisting of a first state and a second state, wherein the bi-directional power supply alternates between operating as a boost converter and as a buck converter depending on which of the two states the control signal is in.

7. The bi-directional power supply of claim 6 further comprising:

a first current sense resistor coupled to the first transistor;

a second current sense resistor coupled to the second transistor, wherein the first current sense resistor and the second current sense resistor provide feedback signals used to control switching of the first transistor and the second transistor.

8. The bi-directional power supply of claim 6 further comprising an inductor coupled between the power line and the first transistor which is used to operate the bi-directional power supply at a boundary between continuous current mode and discontinuous current mode.

9. The bi-directional power supply of claim 8, wherein the inductor comprises part of a transformer and the transformer includes an auxiliary winding which provides a feedback signal used to control switching of the first transistor and the second transistor.

10. The bi-directional power supply of claim 6, wherein the control signal comprises a pulse width modulation signal.

11. The bi-directional power supply of claim 6, wherein the control signal comprises a dimming signal.

12. The method of claim 11, wherein the load corresponds to a light source.

13. A method for providing power to a load comprising:

up-converting an input voltage from a power line to a greater voltage;

storing energy into a capacitor by applying the greater voltage across the capacitor;

releasing energy from the capacitor by discharging the capacitor;

down-converting the voltage across the capacitor and applying a down-converted voltage to the power line;

controlling the up-converting, charging, discharging, and down-converting according to a pulse width modulation dimming signal to balance the energy stored into the capacitor and the energy released from the capacitor to control the inrush current on the power line supplying power to the load, wherein the pulse width modulation dimming signal has two states;

enabling the up-converting of the input voltage and charging of the capacitor when the pulse width modulation dimming signal is in an on state and disabling the down-converting and discharging of the capacitor when the pulse width modulation dimming signal is in the on state; and disabling the up-converting of the input voltage and charging of the capacitor when the pulse width modulation dimming signal is in an off state and enabling the down-converting and discharging of the capacitor when the pulse width modulation dimming signal is in the off state.

14. A system comprising:

a display;

a power supply having a power bus coupled to the display which provides power to the display;

a DC-to-DC step-up converter coupled to the power bus;

a DC-to-DC step-down converter coupled to the power bus;

a capacitor coupled to the step-up converter and the step-down converter, wherein when the step-up converter is enabled, the step-up converter stores energy from the power bus into the capacitor and when the step-down converter is enabled, the step-down converter restores the energy stored in the capacitor to the power bus; and a controller coupled to the step-up converter and the step-down converter to enable and disable the step-up converter and the step-down converter according to a pulse width modulation dimming signal, wherein the pulse width modulation dimming signal has two states, wherein further the step-up converter is enabled and the step-down converter is disabled when the pulse width modulation dimming signal is in one of its two states, and the step-up converter is disabled and the step-down converter is enabled when the pulse width modulation dimming signal is in the other of its two states.

15. The system of claim 14 further comprising:

an inverter coupled to the controller and the power bus;

at least one light source coupled to the inverter.

16. The system of claim 14, wherein the step-up converter comprises a first power MOSFET transistor and a first rectifier coupled in series with the first power MOSFET transistor and the step-down converter comprises a second power MOSFET transistor and a second rectifier coupled in series with the second power MOSFET transistor.

17. The system of claim 16 further comprising a first current sensing resistor and a second current sensing resistor for providing feedback signals used to control the step-up converter and the step-down converter.

18. The system of claim 17 further comprising a transformer coupled to the power bus, the transformer comprising:

an inductor coupled between the power bus and the first power MOSFET transistor which is used to operate at a boundary between continuous and discontinuous current mode; and an auxiliary winding which provides a feedback signal used to control switching of the first power MOSFET transistor and the second power MOSFET transistor.

* * * * *